(12) United States Patent
Ueno

(10) Patent No.: US 11,420,410 B2
(45) Date of Patent: Aug. 23, 2022

(54) SOUND ABSORBING BODY AND SOUND ABSORBING STRUCTURE

(71) Applicant: NIFCO INC., Yokosuka (JP)

(72) Inventor: Taeko Ueno, Yokosuka (JP)

(73) Assignee: NIFCO INC., Yokosuka (JP)

( * ) Notice: Subject to any disclaimer, the term of this patent is extended or adjusted under 35 U.S.C. 154(b) by 369 days.

(21) Appl. No.: 16/485,295

(22) PCT Filed: Feb. 14, 2018

(86) PCT No.: PCT/JP2018/005009
§ 371 (c)(1),
(2) Date: Aug. 12, 2019

(87) PCT Pub. No.: WO2018/151129
PCT Pub. Date: Aug. 23, 2018

(65) Prior Publication Data
US 2019/0389170 A1      Dec. 26, 2019

(30) Foreign Application Priority Data

Feb. 16, 2017  (JP) .............................. JP2017-026636

(51) Int. Cl.
*B32B 3/12*        (2006.01)
*B60R 13/08*       (2006.01)
*G10K 11/162*      (2006.01)
*G10K 11/172*      (2006.01)

(52) U.S. Cl.
CPC ................ *B32B 3/12* (2013.01); *B60R 13/08* (2013.01); *G10K 11/162* (2013.01); *G10K 11/172* (2013.01); *B32B 2307/102* (2013.01)

(58) Field of Classification Search
CPC ..... B32B 3/12; B32B 2307/102; B60R 13/08; G10K 11/162; G10K 11/172
See application file for complete search history.

(56) References Cited

U.S. PATENT DOCUMENTS

| 4,149,612 A * | 4/1979 | Bschorr | G10K 11/172 |
| | | | 181/286 |
| 5,587,564 A * | 12/1996 | Stief | G10K 11/172 |
| | | | 181/286 |
| 6,290,022 B1 * | 9/2001 | Wolf | G10K 11/172 |
| | | | 181/286 |

(Continued)

FOREIGN PATENT DOCUMENTS

| CN | 101801725 A | 8/2010 |
| DE | 4414566 A1 | 11/1995 |

(Continued)

OTHER PUBLICATIONS

International Search Report and Written Opinion for the International Patent Application No. PCT/JP2018/005009, dated May 15, 2018, 7 pages.

*Primary Examiner* — Forrest M Phillips
(74) *Attorney, Agent, or Firm* — KDB Firm PLLC

(57) ABSTRACT

A sound absorbing body includes a cup-shaped main body and a porous sheet. The cup-shaped main body includes an opening portion and a bottom portion. The porous sheet covers the opening portion. The main body includes, between the opening portion and the bottom portion, at least one hole that is larger than pores of the porous sheet and extends through the main body.

13 Claims, 5 Drawing Sheets

(56) References Cited

U.S. PATENT DOCUMENTS

| | | | | |
|---|---|---|---|---|
| 7,571,790 B2* | 8/2009 | Kim | ............................ | E04B 1/86 |
| | | | | 181/293 |
| 2006/0289229 A1* | 12/2006 | Yamaguchi | ............ | G10K 11/172 |
| | | | | 181/290 |
| 2010/0307867 A1* | 12/2010 | Ogawa | ...................... | B32B 15/20 |
| | | | | 181/288 |
| 2017/0225764 A1* | 8/2017 | Nampy | .................... | B64C 1/066 |
| 2021/0309164 A1* | 10/2021 | Fukui | .......................... | B32B 7/12 |

FOREIGN PATENT DOCUMENTS

| | | |
|---|---|---|
| DE | 10128207 A1 | 12/2002 |
| EP | 2189334 A1 | 5/2010 |
| JP | H10326097 A | 12/1998 |
| JP | 2005031241 A | 2/2005 |
| JP | 2012008458 A | 1/2012 |
| WO | 2009037765 A1 | 3/2009 |
| WO | 2018151129 A1 | 8/2018 |

* cited by examiner

SOUND ABSORBING BODY AND SOUND ABSORBING STRUCTURE

This is a national stage application filed under 35 U.S.C. § 371 of pending international application PCT/JP2018/005009 filed Feb. 14, 2018, which claims priority to Japanese Patent application JP 2017-026636, filed Feb. 16, 2017, the entirety of which applications are hereby incorporated by reference herein.

TECHNICAL FIELD

The present disclosure relates to a sound absorbing body that includes a structure for absorbing sound and to a sound absorbing structure.

BACKGROUND ART

As an example of the sound absorbing body, devices for reducing noise generated by a vehicle engine have been known (for example, refer to Patent Document 1). This kind of a sound absorbing body includes, for example, a sound absorbing material including non-woven fabric and cup-shaped cells, which are two-dimensionally arranged on a thin plate-like reflector. One of the openings of each cup-shaped cell is joined to a surface of the sound absorbing material, and the other one of the openings of the cup-shaped cell is joined to a surface of a plate member. The sound absorbing material is located to face the source of sound, so that the sound absorbing body absorbs the noise generated by the source of sound by the cooperation of the sound absorbing material and the cup-shaped cells.

PRIOR ART DOCUMENT

Patent Document

Patent Document 1: Japanese Laid-Open Patent Publication No. 2005-31241

SUMMARY OF THE INVENTION

Problems that the Invention is to Solve

The frequency band of the sound that the sound absorbing body can absorb is determined to either a high-frequency band or a low-frequency band in accordance with the mass per unit area and the thickness of the sound absorbing material and the height and the opening size of the cup-shaped cells. Since the frequency band required to be absorbed by the sound absorbing body may range between both the high-frequency band and the low-frequency band, it is desirable to broaden the frequency band of the sound that can be absorbed by the sound absorbing body.

Accordingly, it is an objective of the present disclosure to provide a sound absorbing body that is capable of absorbing sound in a broad frequency band and a sound absorbing structure.

Means for Solving the Problems

In accordance with one aspect of the present disclosure, a sound absorbing body is provided that includes a cup-shaped main body and porous sheet. The cup-shaped main body includes an opening portion and a bottom portion. The porous sheet covers the opening portion. The main body includes, between the opening portion and the bottom portion, at least one hole that is larger than pores of the porous sheet and extends through the main body.

In accordance with another aspect, a sound absorbing structure is provided that includes cup-shaped main bodies, porous sheets, and a wall portion. Each main body includes an opening portion and a bottom portion. The porous sheets respectively cover the opening portions. The wall portion faces the bottom portions and is shared among the bottom portions. The main bodies each include, between the opening portion and the bottom portion, at least one hole that is larger than pores of the porous sheets and extends through the main body.

MODES FOR CARRYING OUT THE INVENTION

A sound absorbing body according to one embodiment will be described with reference to FIGS. 1 to 7. First, the structure of the sound absorbing body is described. Subsequently, the operation of the sound absorbing body is described. Then, the measurement results of the coefficient of sound absorption with test examples are described. The measurement results show the advantages of the structure of the sound absorbing body.

Figure 1:
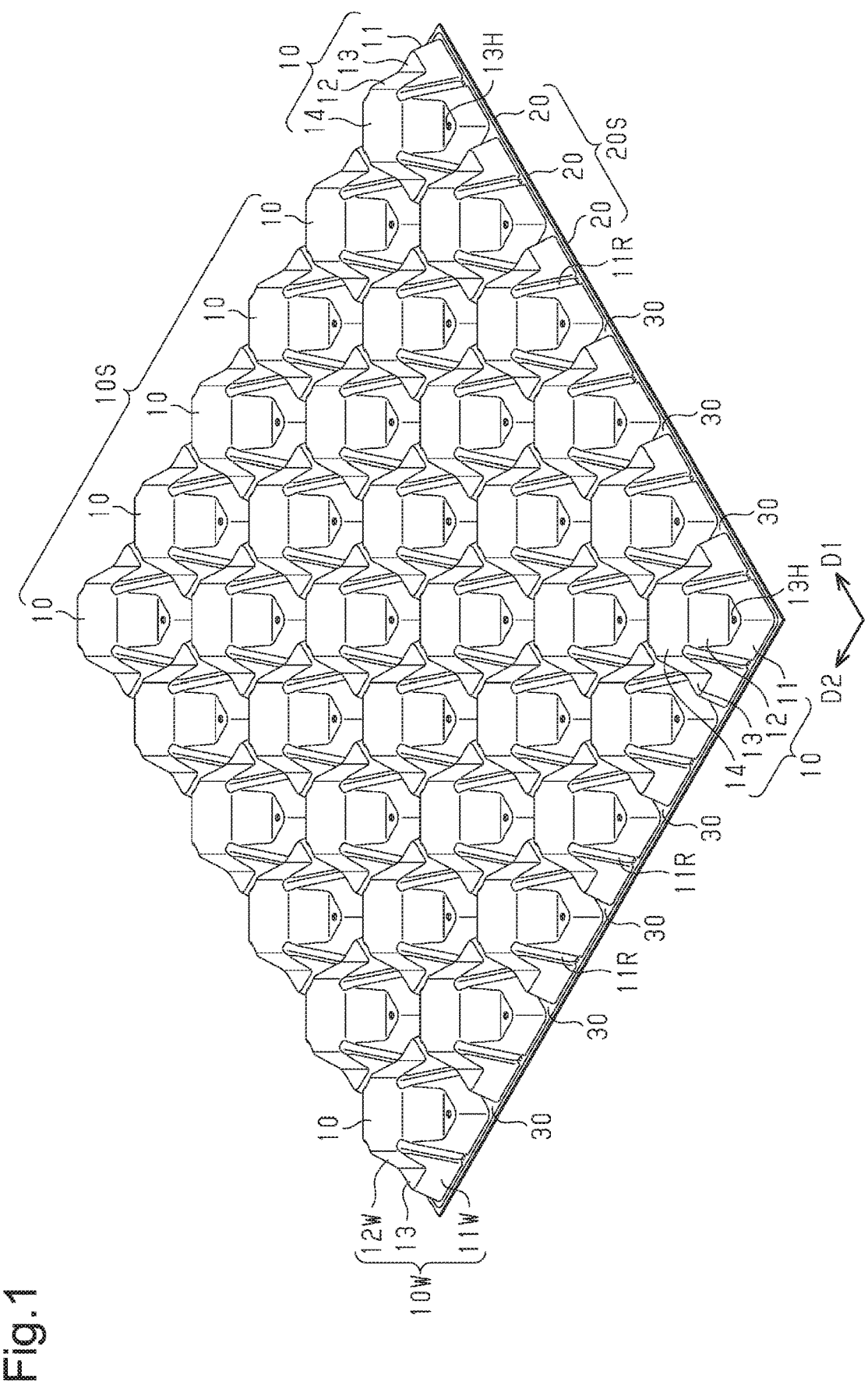
FIG. 1 is a perspective view of a sound absorbing body according to one embodiment, showing the structure of the lower surface.
Figure 2:
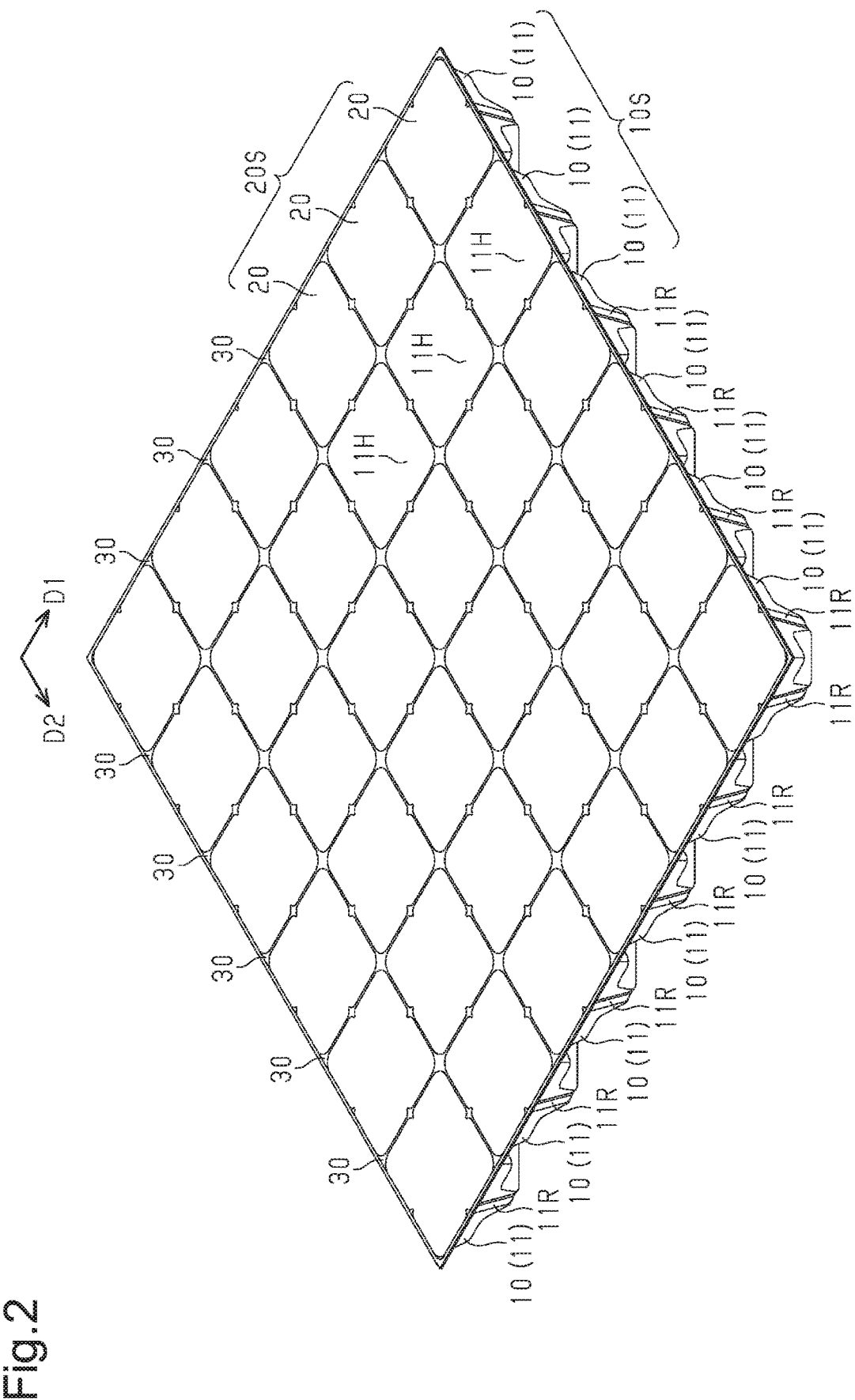
FIG. 2 is a perspective view of the sound absorbing body of FIG. 1, showing the structure of the upper surface.

As shown in FIGS. 1 and 2, the sound absorbing body includes a first processed sheet 10S and a second processed sheet 20S, which are stacked on one another. The first processed sheet 10S is, for example, a processed plastic sheet, and the second processed sheet 20S is, for example, a processed sheet formed of any one of non-woven fabric, woven fabric, Japanese paper, and foam. The first processed sheet 10S includes main bodies 10. The second processed sheet 20S includes porous sheets 20 each corresponding to one of the main bodies 10. One of the main bodies 10 and one of the porous sheets 20 corresponding to the main body 10 configure a sound absorbing element. The sound absorbing elements are two-dimensionally arranged in a first direction D1 and a second direction D2, which are orthogonal to each other. The sound absorbing elements that are adjacent to each other in the first direction D1 and the sound absorbing elements that are adjacent to each other in the second direction D2 are coupled by hinges 30.

As shown in FIG. 1, each main body 10 has a membrane structure having a two-tiered inverted frustum shape and includes a large tubular portion 11, a small tubular portion 12, and flanges 13. The large tubular portion 11 has a rectangular tubular shape including an opening portion 11H, which is an opening portion of the main body 10 (refer to FIG. 2). The small tubular portion 12 has a rectangular tubular shape including a bottom portion 14 of the main body 10. The flanges 13 extend radially outward of the small tubular portion 12 from the sides of the opening portion of the small tubular portion 12 and are connected to the small tubular portion 12 and the large tubular portion 11. The flange 13 includes a hole 13H, which extends through the flange 13 as viewed from the direction facing the bottom portion 14. The size of each hole 13H is sufficiently larger than the size of fine pores of the porous sheet 20.

A peripheral wall 11W of the large tubular portion 11, a peripheral wall 12W of the small tubular portion 12, and the flanges 13 constitute a tubular portion 10W of the main body 10. The tubular portion 10W has a two-tiered rectangular tubular shape and connects the opening portion 11H of the large tubular portion 11 to the bottom portion 14 of the small tubular portion 12. The tubular portion 10W includes ribs 11R, which extend from the corners of the bottom portion 14 toward the opening of the main body 10. The ribs 11R are recessed ribs, which are recessed inward of the main body 10. Each rib 11R is located on one of the four surfaces of the tubular portion 10W of the large tubular portion 11.

As shown in FIG. 2, the opening portion 11H of each large tubular portion 11 is covered with the separate porous sheet 20. As described above, the porous sheet 20 is formed of, for example, any one of non-woven fabric, woven fabric, Japanese paper, and foam. The size of the fine pores of the porous sheet 20 is sufficiently smaller than the size of the holes 13H. As viewed from the direction facing the porous sheet 20, each opening portion 11H is shaped like a rectangular frame, and each porous sheet 20 is a rectangular sheet. The hinges 30 are formed as welding portions of a part of the first processed sheet 10S and a part of the second processed sheet 20S. The hinges 30 are shaped like a rectangular frame surrounding the associated opening portion 11H. Each hinge 30 is flexible so as to be bent along the axis of bending extending along the hinge 30 and permits two of the main bodies 10 coupled by the hinge 30 to be displaced by the bending at the hinge 30.

The hinges 30 are formed by, for example, thermally welding the section defining the edges of the opening portion 11H of each main body 10 to the second processed sheet 20S. The main bodies 10 are formed by, for example, drawing in part of the plastic sheet for forming the first processed sheet 10S into a mold for forming the main bodies 10, which is called vacuum forming. The thermal welding for forming the hinges 30 and vacuum forming for forming the main bodies 10 can also be performed simultaneously. The main bodies 10 may also be formed by, for example, pressing part of the plastic sheet for forming the first processed sheet 10S with a mold for forming the main bodies 10, which is called pressing. In this case, after performing pressing for forming the main bodies 10, the thermal welding for forming the hinges 30 is performed.

Figure 3:
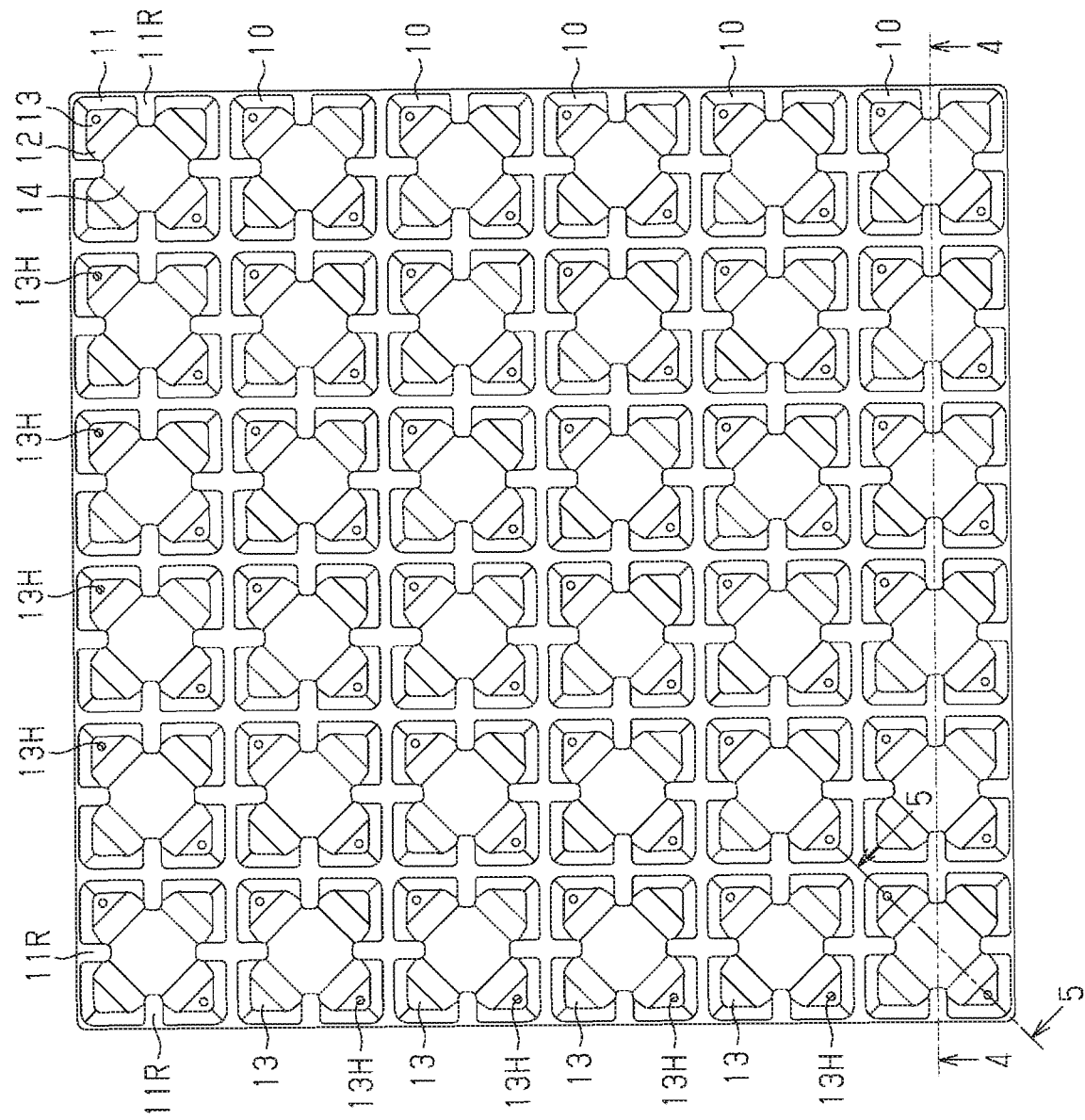
FIG. 3 is a bottom view of the sound absorbing body of FIG. 1 showing the structure of the lower surface.

As shown in FIG. 3, as viewed from the direction facing the bottom portion 14, the large tubular portion 11 and the small tubular portion 12 are located on the same central axis. In the circumferential direction about the central axis of the large tubular portion 11, the large tubular portion 11 includes four corners, and the small tubular portion 12 also includes four corners. The position of the corners of the large tubular portion 11 and the position of the corners of the small tubular portion 12 differ from each other about the central axis. The shape of the small tubular portion 12 is, for example, similar to the shape of the large tubular portion 11 rotated by 45° about the central axis.

The sound absorbing body is, for example, located between a wall portion such as the liner of a vehicle passenger compartment and the source of sound. In this case, the sound absorbing body is located such that the bottom portions 14 of the main bodies 10 face the wall portion, and the pressure applied from the wall portion or the pressure applied from the side corresponding to the source of sound may act to crush the main bodies 10. In this respect, since the corners of the large tubular portion 11 and the corners of the small tubular portion 12 are located at different positions in the circumferential direction of the central axis, the sections that are mechanically highly strong against the pressure like these corners are spread in the circumferential direction of the main bodies 10. Thus, the shape of the main bodies 10 is maintained against the pressure that acts in the direction to crush the main bodies 10.

As viewed from the direction facing the bottom portion 14, the flanges 13 are shaped like triangular plates. The triangular plate-like shape of each flange 13 includes a base, which corresponds to each side of the opening portion of the small tubular portion 12, and a vertex, which corresponds to one of the corners of the large tubular portion 11. Each main body 10 includes four flanges 13. Two of the four flanges 13 located diagonally to each other each include the hole 13H.

Each rib 11R extends from one of the corners of the bottom portion 14 to the hinge 30 that faces the corner and extends in a direction orthogonal to the extending direction of the hinge 30. When the hinge 30 is bent, the main bodies 10 integrated with the hinge 30 are likely to flex or stretch in accordance with the deformation of the hinge 30. In this case, as described above, since the ribs 11R connected to the hinge 30 extend in a direction orthogonal to the extending direction of the hinge 30, the flection and the stretching of the main bodies 10 caused by the deformation of the hinge 30 are limited, and the shape of the main bodies 10 are maintained.

Figure 4:
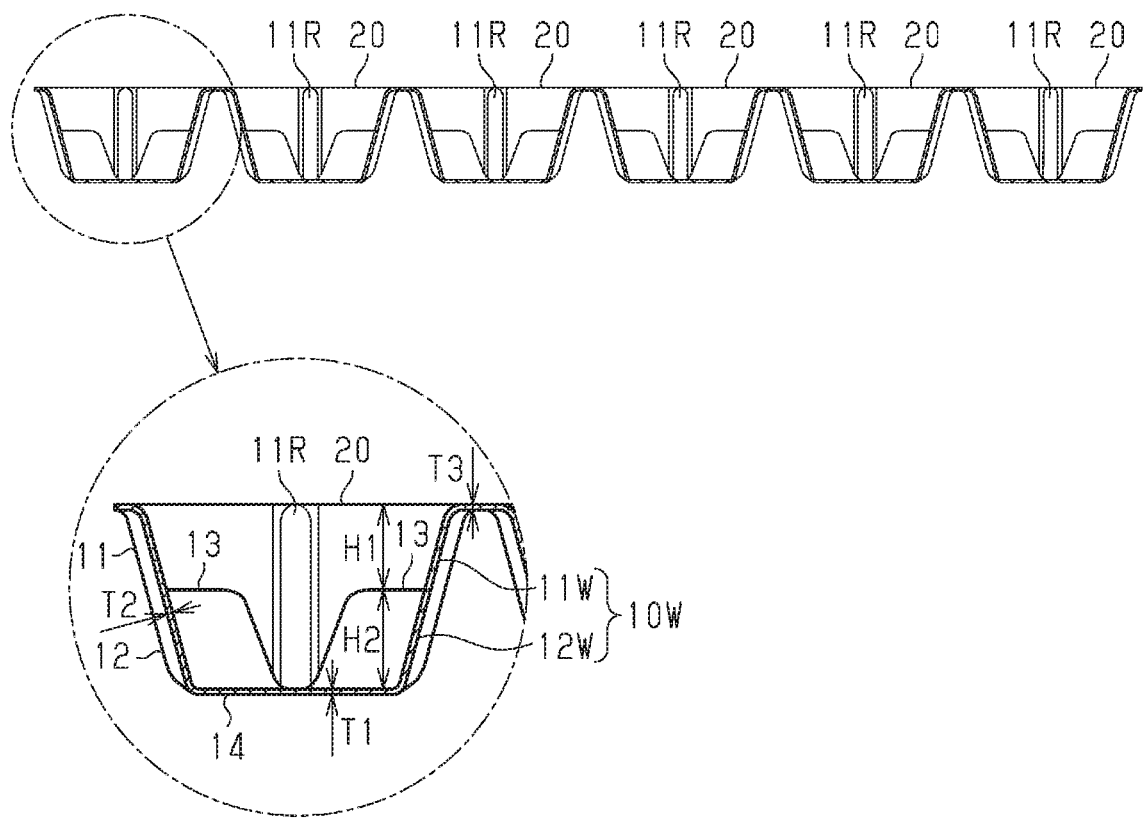
FIG. 4 is a cross-sectional view taken along line 4-4 of FIG. 3.

As shown in FIG. 4, the large tubular portion 11 has a height H1, and the small tubular portion 12 has a height H2 greater than the height H1. The height H1 of the large tubular portion 11 may be the same as the height H2 of the small tubular portion 12 or may be greater than the height H2 of the small tubular portion 12. The height H1 of the large tubular portion 11 and the height H2 of the small tubular portion 12 can be changed as required by changing the mold for forming the main bodies 10.

A thickness T1 of the bottom portion 14 may be the same as the thickness of the tubular portion 10W of the main body 10 or may differ from a thickness T2 of the tubular portion 10W of the main body 10. The thickness T1 of the bottom portion 14 may be the same as a thickness T3 of the hinge 30 or may be different from the thickness of the hinge 30. The thickness T1 of the bottom portion 14, the thickness T2 of the tubular portion 10W of the main body 10, and the thickness T3 of the hinge 30 may be changed as required by changing, for example, the molding conditions when the main bodies 10 are formed through vacuum forming or pressing, or the forming conditions when the hinges 30 are formed through the thermal welding. The height H1 of the large tubular portion 11, the height H2 of the small tubular portion 12, the thickness T1 of the bottom portion 14, and the thickness T2 of the tubular portion 10W may be set as required in accordance with the frequency band required to be absorbed by the main bodies 10 and the mechanical strength required of the main bodies 10.

Figure 5:
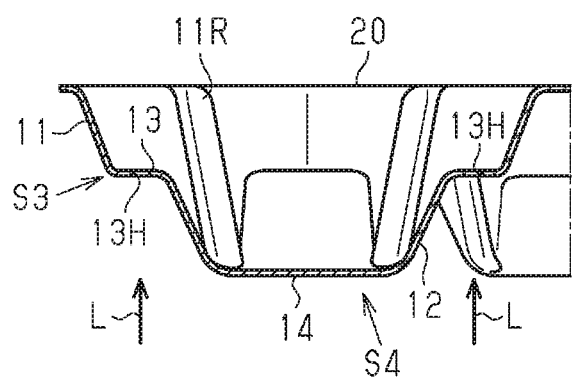
FIG. 5 is a cross-sectional view taken along line 5-5 of FIG. 3.

As shown in FIG. 5, the direction in which the flanges 13 extend is substantially parallel to the direction in which the bottom portion 14 extends. In the direction in which the flanges 13 and the bottom portion 14 extend, an area S3 of each flange 13 is smaller than an area S4 of the bottom portion 14. The area S3 of the flange 13 may be the same as the area S4 of the bottom portion 14 or may be greater than the area S4 of the bottom portion 14. The area S3 of each flange 13 and the area S4 of the bottom portion 14 may be changed as required by changing the mold for forming the main bodies 10.

A method for manufacturing the sound absorbing body may include, for example, first forming the holes 13H in a plastic sheet for forming the first processed sheet 10S, and subsequently obtaining the shape of the main bodies 10 from the plastic sheet in which the holes 13H are formed. In this case, however, since the shape of the main bodies 10 is obtained using vacuum forming or pressing, the shape or the size of the already processed holes 13H may be changed from the designed dimension. In this respect, with the structure in which the flanges 13 are configured to extend outward from the opening portion of the small tubular portion 12 and to be exposed as viewed from the direction facing the bottom portion 14 like the above-described structure, the method may be employed in which the shapes of the main bodies 10 are first formed from the plastic sheet and the holes 13H are subsequently formed by emitting a laser L to the flanges 13. As a result, the accuracy of the shape and the size of the holes 13H is increased. The size of the flanges 13, the size of the bottom portions 14, the shape of the holes 13H, and the size of the holes 13H are set as required in accordance with the frequency band required to be absorbed by the main bodies 10 and the frequency band required to be absorbed by the holes 13H.

Next, operations of the sound absorbing body will be described.

Figure 6:
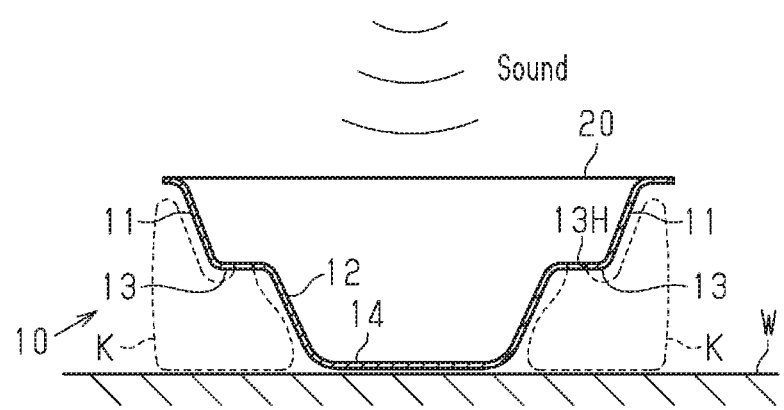
FIG. 6 is an operational diagram illustrating the operation of the sound absorbing body of FIG. 1.

As shown in FIG. 6, the sound transmitted from the outside of the sound absorbing body to each porous sheet 20 is transmitted to the air in the fine pores of the porous sheet 20 and is consumed by the vibration of, for example, the fibers constituting the porous sheet 20 and the friction against the fibers. As a result, the sound transmitted to the porous sheet 20 is partially absorbed by the porous sheet 20. Such a porous type sound absorption absorbs, for example, the sound in a high-frequency band.

The sound that is transmitted to the inside of the main body 10 through the porous sheet 20 is transmitted to the air inside the main body 10 and is consumed by the vibration of the membrane structure of the tubular portion 10W, which constitutes the main body 10. As a result, the sound that is not absorbed by the porous sheet 20 and is transmitted to the inside of the main body 10 is partially absorbed by the membrane structure, which constitutes the main body 10. The structure involved in the sound absorption performed by the porous sheet 20 and its type, which is the porous type, differs from the structure involved in the sound absorption performed by the main body and its type, which is the membrane vibration type. Thus, the frequency bands of the sound absorbed by these structures also differ from each other. The membrane vibration type sound absorption absorbs the sound in a frequency band lower than that of the porous type sound absorption.

The sound that is transmitted from the inside of the main body 10 to the outside of the main body 10 is transmitted to the air passing through the holes 13H, which constitute the main body 10, and is consumed by the system formed by the space surrounding the small tubular portion 12 and the holes 13H. That is, the flanges 13 including the holes 13H and the surroundings of the main body 10 including the space sandwiched between the flanges 13 and a wall portion W function as a Helmholtz resonator K. As a result, the sound transmitted from the inside of the main body 10 to the outside of the main body 10 is partially absorbed by the system formed by the cavity surrounding the small tubular portion 12 and the holes 13H. The structure of the holes 13H involved in the sound absorption and its type, which is the resonator type, differs from the structures involved in the sound absorption performed by the main body 10 and the porous sheet 20 and their types. Thus, the frequency bands of the sound absorbed by these structures also differ from one another. The resonator type sound absorption absorbs the sound in a frequency band even lower than the frequency band of the sound absorbed by the membrane vibration type absorption. The sum of the height H1 of the large tubular portion 11 and the height H2 of the small tubular portion 12 described above corresponds to the height of the air layer inside the main body 10. In particular, if the height of the air layer is not sufficient, the sound of a low-frequency band is hard to be absorbed with the porous type sound absorption and the membrane vibration type sound absorption described above. In this respect, with the sound absorbing body including the holes 13H, even if the height of the air layer is not sufficient, the resonator type sound absorption absorbs the sound in a low-frequency band.

Test Examples

Figure 7:
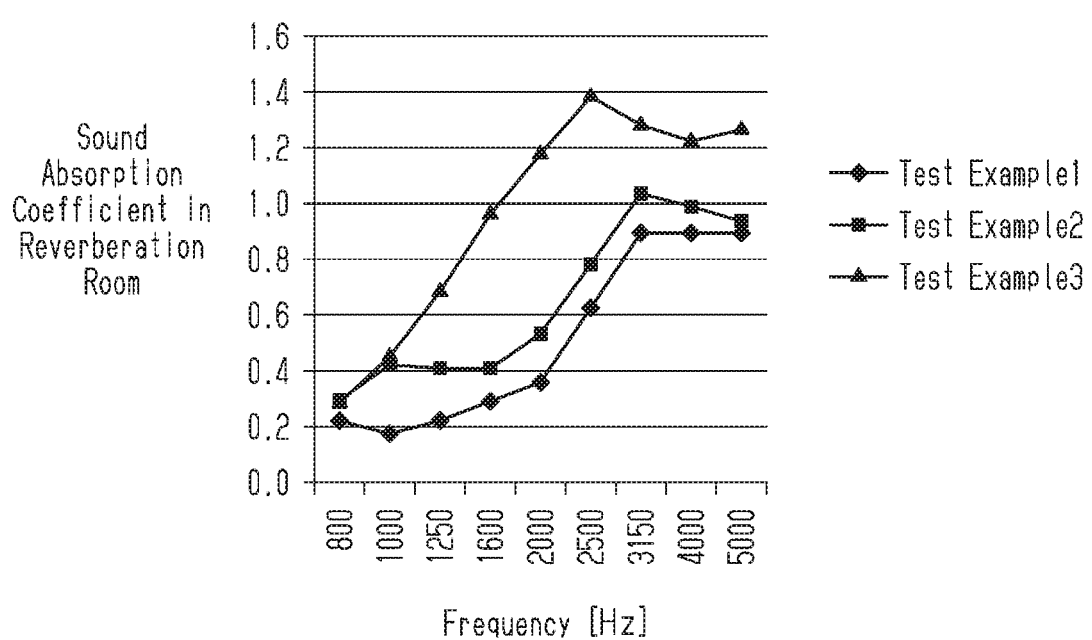
FIG. 7 is a graph showing the sound absorbing properties according to test examples.

A polypropylene sheet was used as the plastic sheet to obtain the first processed sheet 10S without the holes 13H. Thus, the sound absorbing body without the holes 13H nor the second processed sheet 20S was obtained as a test example 1. The holes 13H were formed in the first processed sheet 10S of the test example 1. Thus, the sound absorbing body with the holes 13H and without the second processed sheet 20S was obtained as a test example 2. A non-woven fabric was thermally welded to the first processed sheet 10S of the test example 2. Thus, the sound absorbing body with the holes 13H and the second processed sheet 20S was obtained as a test example 3. Subsequently, in each of the test example 1, the test example 2, and the test example 3, the sound absorption coefficient in a reverberation room according to ISO 345 was measured. The measurement results of the sound absorption coefficient in a reverberation room using the test examples are shown in FIG. 7. The sound absorption coefficient in a reverberation room was mainly measured in the range of 800 Hz to 5000 Hz that is particularly easy to hear in the generally audible range of human.

As shown in FIG. 7, the sound absorption coefficient in a reverberation room of the test example 2 was higher than the sound absorption coefficient in a reverberation room of the test example 1 in the range of 800 Hz to 5000 Hz. In the low-frequency band of this range, in particular, in the range of 800 Hz to 2000 Hz, significant improvement was seen. Additionally, the sound absorption coefficient in a reverberation room of the test example 3 was higher than the sound absorption coefficient in a reverberation room of the test example 2 in the range of 1000 Hz to 5000 Hz, and in particular, significant improvement was seen in the range of 1000 Hz to 4000 Hz. As a result, it was found that the structure including the porous sheet 20 enhances the sound absorption performance in the high-frequency band, and the structure including the holes 13H enhances the sound absorption performance in the low-frequency band.

The above-described embodiment has the following advantages.

(1) The porous sheet 20, which covers the opening portion 11H, performs the porous type sound absorption, which absorbs the sound in the high-frequency band, and the holes 13H, which extend through the main body 10, perform the resonator type sound absorption, which absorbs the sound in the low-frequency band. Thus, the frequency band of the sound that the sound absorbing body can absorb is broadened compared with a sound absorbing body that performs only the porous type sound absorption.

(2) The main bodies 10 that are adjacent to each other are bent at the associated hinge 30. Thus, the main bodies 10 are located in conformance with the shape of the surface on which the sound absorbing body is placed. As a result, the range of the structure such as the wall portion on which the sound absorbing body is applied is expanded, and the sound directed toward the wall portion on which the sound absorbing body is located is effectively absorbed.

(3) The sound absorbed by the porous sheet 20, the sound absorbed by the holes 13H, and the sound having a different frequency band from these sounds are further absorbed by the membrane vibration type sound absorption performed by the main body 10.

(4) The space corresponding to the difference between the size of the large tubular portion 11 and the size of the small tubular portion 12 is provided around the small tubular portion 12. The space faces the holes 13H and performs the resonator type sound absorption described above in a suitable manner.

(5) To manufacture the sound absorbing body, for example, a laser that proceeds from the bottom portions 14 toward the opening portions 11H is emitted to the flanges 13 to form the holes 13H. Thus, the holes 13H can be formed in the main bodies 10 even after the main bodies 10 are formed and even after the opening portions 11H are covered with the porous sheets 20.

(6) The mechanical strength of each tubular portion 10W is enhanced by the ribs 11R. This stabilizes the structure of the sound absorbing body and thus increases the reproducibility of obtaining the advantages equivalent to (1) to (5).

The above-described embodiment may be modified as follows.

[Sound Absorbing Body]

The sound absorbing body can be configured by one of the sound absorbing elements described above. That is, the sound absorbing body may include one main body 10 and one porous sheet 20. The number of the sound absorbing elements of the sound absorbing body, and the direction in which the sound absorbing elements are arranged in the sound absorbing body may be changed as required based on the size and the shape of the space to which the sound absorbing body is applied.

The sound absorbing body may include multiple sound absorbing elements having different sizes from each other and may include multiple sound absorbing elements having different shapes from each other. The multiple sound absorbing elements of the sound absorbing body may include the main bodies 10 in different sizes from each other and may include the porous sheets 20 formed of different materials from each other.

[Main Body 10]

The tubular portion 10W of each main body 10 does not necessarily have to include, for example, the flanges 13 and may be shaped without the step. In this case, the holes 13H of the main body 10 extend through the tubular portion 10W in the radial direction of the tubular portion 10W.

The shape of the tubular portion 10W of each main body 10 may have a multi-tiered tubular shape including three or more tiers. In this case, the holes 13H of the main body 10 may be located on the flange of each tier of the tubular portion 10W.

The large tubular portion 11 may have any of an inverted conical frustum shape, an inverted polygonal pyramidal frustum shape, a cylindrical shape, and a polygonal tubular shape. The small tubular portion 12 may has any of an inverted conical frustum shape, an inverted polygonal pyramidal frustum shape, a cylindrical shape, a polygonal tubular shape, an inverted circular conical shape, and an inverted pyramid shape. If the small tubular portion 12 has an inverted conical shape, the bottom portion of the main body 10 corresponds to the base of the small tubular portion 12.

[Rib 11R]

The number of the ribs 11R on each main body 10 may be two or more on each side of the large tubular portion 11. Alternatively, the large tubular portion 11 may include a side surface from which the rib 11R is omitted.

The shape of the ribs 11R of the main bodies 10 may be a projection projecting outward from the main bodies 10. Each main body 10 may include a combination of the projecting ribs and the recessed ribs as the ribs 11R.

The ribs 11R may be omitted from the small tubular portion 12 and may be located on only the large tubular portion 11, and vice versa. That is, the ribs 11R may be omitted from the large tubular portion 11 and may be located on only the small tubular portion 12.

[Hole 13H]

The holes 13H of each main body 10 may, for example, extend through the tubular portion 10W in the radial direction of the tubular portion 10W.

The number of the holes 13H included in each main body 10 may be one or more than two.

Each main body 10 may include the holes 13H having different shapes from each other and may include the holes 13H having different sizes from each other. The sound absorbing body may include multiple main bodies 10 each including the holes 13H having a different shape from those of other main bodies 10, or may include multiple main bodies 10 each including the holes 13H having a different size from those of other main bodies 10.

[Others]

The sound absorbing body may include multiple main bodies 10 and a wall portion, which faces the bottom portions 14 and is shared among the bottom portions 14. The wall portion functions as, for example, the liner of a vehicle passenger compartment. As described above, according to the structure further including the wall portion, the sound absorbing body including the multiple main bodies 10 is easily transported or mounted since the sound absorbing body includes the wall portion shared among the bottom portions 14.

[Sound Absorption Structure]

The sound absorbing structure includes the multiple main bodies, the porous sheets, and the wall portion, which faces the bottom portions of the main bodies and is shared among the bottom portions. As described above, the main bodies are cup-shaped and each include the opening portion and the bottom portion, and the porous sheets cover the opening portions. Each main body includes at least one hole between the opening portion and the bottom portion. The hole is larger than the pores of the porous sheets and extends through the main body. Such a sound absorbing structure has the advantages equivalent to the above advantages (1) to (6) and facilitates transporting and mounting of the sound absorbing structure. For example, if the present sound absorbing structure is to be installed in the interior of a vehicle, the main bodies may be mounted on an interior trim board to perform the resonator type sound absorption between the main bodies and the interior trim board. The wall portion is not limited to the interior trim board but may be a body panel.

The invention claimed is:

1. A sound absorbing body comprising:
   a first sheet that forms a cup-shaped main body including an opening portion and a bottom portion; and
   a second sheet that is a porous sheet covering the opening portion,
   wherein the main body includes, between the opening portion and the bottom portion, at least one hole that is larger than pores of the second sheet, extends through the first sheet, and communicates an inside of the main body to an outside of the main body,
   the main body includes a tubular portion that connects the opening portion to the bottom portion, and
   the tubular portion includes a rib having a first end at the opening portion and a second end at the bottom portion, and extends from the first end to the second end.

2. The sound absorbing body according to claim 1, further comprising:
   a plurality of the main bodies; and
   a hinge that couples the opening portions of the main bodies that are adjacent to each other.

3. The sound absorbing body according to claim 1, wherein the main body includes a tubular membrane structure capable of vibrating.

4. The sound absorbing body according to claim 1, wherein:
   the tubular portion has a two-tiered inverted frustum tubular shape and includes a large tubular portion with the opening portion, a small tubular portion with the bottom portion, and a flange that extends radially outward of the small tubular portion and connects the large tubular portion to the small tubular portion, and
   the hole extends through the flange as viewed from a direction facing the bottom portion.

5. The sound absorbing body according to claim 1, wherein the second sheet is made of any of non-woven fabric, woven fabric, Japanese paper, and foam.

6. The sound absorbing body according to claim 1, further comprising:
   a plurality of the main bodies; and
   a wall portion facing the bottom portions and shared among the bottom portions.

7. The sound absorbing body according to claim 2, wherein:
   the hinge is flexible so as to be bent along a bending axis that extends along the hinge thereby permitting two of the main bodies coupled by the hinge to be displaced by the bending at the hinge.

8. A sound absorbing structure comprising:
   a first sheet that forms a plurality of cup-shaped main bodies each including an opening portion and a bottom portion;
   a second sheet that is a porous sheet covering the opening portions,
   a wall portion that faces the bottom portions and shared among the bottom portions,
   wherein the main bodies each include, between the opening portion and the bottom portion, at least one hole that is larger than pores of the second sheet, extends through the first sheet, and communicates an inside of the main body to an outside of the main body,
   each of the main bodies includes a tubular portion that connects the opening portion to the bottom portion, and
   the tubular portion includes a rib having a first end at the opening portion and a second end at the bottom portion, and extends from the first end to the second end.

9. The sound absorbing structure according to claim 8, further comprising:
   a plurality of hinges each coupling the opening portions of the main bodies that are adjacent to each other.

10. The sound absorbing structure according to claim 9, wherein:
    each of the hinges is flexible so as to be bent along a bending axis that extends along the hinge thereby permitting two of the main bodies coupled by the hinge to be displaced by the bending at the hinge.

11. The sound absorbing structure according to claim 8, wherein each of the main bodies includes a tubular membrane structure capable of vibrating.

12. The sound absorbing structure according to claim 8, wherein:
    the tubular portion has a two-tiered inverted frustum tubular shape and includes a large tubular portion with the opening portion, a small tubular portion with the bottom portion, and a flange that extends radially outward of the small tubular portion and connects the large tubular portion to the small tubular portion, and
    each of the holes extends through the flange as viewed from a direction facing the bottom portion.

13. The sound absorbing structure according to claim 8, wherein the second sheet is made of any of non-woven fabric, woven fabric, Japanese paper, and foam.

\* \* \* \* \*